US012792678B2

(12) United States Patent
Katariya et al.

(10) Patent No.: US 12,792,678 B2
(45) Date of Patent: Nov. 10, 2026

(54) SYSTEMS AND METHODS FOR PROCESSING HETEROGENEOUS AND TEMPORALLY UNALIGNED DATA

(71) Applicant: Capital One Services, LLC, McLean, VA (US)

(72) Inventors: Dwipam Katariya, Ashburn, VA (US); Thomas Caputo, Fairfax, VA (US); Yage Wang, Fairfax, VA (US); Arturo Hernandez Zeledon, Arlington, VA (US); Qi Yu, Wellesley, MA (US); Giridharan Iyengar, Ashburn, VA (US); Juan Origgi, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 19/035,776

(22) Filed: Jan. 23, 2025

(65) Prior Publication Data

US 2026/0211962 A1 Jul. 23, 2026

(51) Int. Cl.
*G06F 16/9537* (2019.01)
*H04L 51/02* (2022.01)

(52) U.S. Cl.
CPC .......... *G06F 16/9537* (2019.01); *H04L 51/02* (2013.01)

(58) Field of Classification Search
None
See application file for complete search history.

(56) References Cited

U.S. PATENT DOCUMENTS

| | | | | |
|---|---|---|---|---|
| 11,200,506 | B2 * | 12/2021 | Wu | G06F 40/30 |
| 11,847,565 | B1 | 12/2023 | Hao et al. | |
| 11,893,346 | B2 * | 2/2024 | Wan | G06F 40/42 |
| 2021/0034977 | A1 * | 2/2021 | Arik | G06N 3/045 |
| 2022/0358288 | A1 | 11/2022 | Wan et al. | |
| 2023/0252140 | A1 * | 8/2023 | Coulter | H04L 63/1425 726/23 |

(Continued)

OTHER PUBLICATIONS

Extended European Search Report on EP Application No. 25227869.2 dated Apr. 7, 2026 (13 pages).

(Continued)

*Primary Examiner* — Amresh Singh
(74) *Attorney, Agent, or Firm* — Foley & Lardner LLP

(57) ABSTRACT

A device may retrieve data representing a plurality of activity sequences associated with a plurality of channels. Each activity sequence may include a plurality of activity entries having data values for a plurality of fields. The plurality of activity entries may be associated with respective timestamps. The plurality of activity sequences may have respective temporal resolutions. The device may flatten the data values for the plurality of activity sequences, across the plurality of activity entries, the plurality of fields, and the plurality of channels, into a single time-ordered activity sequence. The device may generate activity data embeddings using the single time-ordered activity sequence, generate, using an encoder module, an encoder output based on the activity data embeddings and temporal information based on the respective timestamps, input the encoder output into a decoder module, and generate, using the decoder module, a decoder output based on the encoder output.

20 Claims, 4 Drawing Sheets

(56) References Cited

U.S. PATENT DOCUMENTS

| | | | | |
|---|---|---|---|---|
| 2023/0252980 | A1* | 8/2023 | Kumar | H04L 51/212 704/257 |
| 2024/0242024 | A1* | 7/2024 | Moon | G06F 40/126 |

OTHER PUBLICATIONS

Katariya et al., "TIMeSynC: Temporal Intent Modelling with Synchronized Context Encodings for Financial Service Applications," arxiv.org, Cornell University Library, Oct. 2024, arXiv: XP091912080.

* cited by examiner

400

SYSTEMS AND METHODS FOR PROCESSING HETEROGENEOUS AND TEMPORALLY UNALIGNED DATA

BACKGROUND

In recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence may rely on large amounts of high-quality data. The process for obtaining this data and ensuring it is high-quality can be complex and time-consuming. Additionally, data that is obtained may need to be categorized and labeled accurately, which can be difficult, time-consuming and a manual task. Second, despite the mainstream popularity of artificial intelligence, practical implementations of artificial intelligence may require specialized knowledge to design, program, and integrate artificial intelligence-based solutions, which can limit the amount of people and resources available to create these practical implementations. Finally, results based on artificial intelligence can be difficult to review as the process by which the results are made may be unknown or obscured. This obscurity can create hurdles for identifying errors in the results, as well as improving the models providing the results. These technical problems may present an inherent problem with attempting to use an artificial intelligence-based solution to make predictions or recommendations based on heterogeneous and temporally unaligned data.

SUMMARY

Methods and systems are described herein for novel uses and/or improvements to artificial intelligence applications. As one example, methods and systems are described herein for improving the accuracy of predictions generated by a machine learning system based on nonuniform user activity data derived from multiple channels (e.g., a web channel, a mobile application channel, an email channel, etc.) and having heterogeneous temporal resolutions (e.g., activity data may be collected in different channels according to different time intervals).

A multi-channel framework may be employed by an organization to facilitate user interactions with the organization across various channels, such as a mobile channel, a web channel, a call center channel, a physical store channel, or the like. In multi-channel frameworks, user data may be captured in a channel-specific manner for each channel. Thus, the data for different channels may have different tabular schema, different temporal resolutions, etc. For example, in a mobile channel, data relating to use of a mobile application may be collected at one minute intervals, whereas in a call center channel, data relating to a call interaction may be collected on a per-call basis. Existing systems may use an encoder-decoder transformer architecture to process user data sequences and make predictions (e.g., about a user's intent). However, these systems may fail to properly account for the heterogeneous nature of the data, thereby leading to predictions that are inaccurate. In particular, existing systems may be unable to align data sequences collected with different sampling rates, may be unable to learn temporal dynamics across multi-variate, multi-channel sequences, and may be unable to combine dynamic and static sequences. For example, existing systems may lack the ability to incorporate seasonal, periodic, and/or temporal behavior across multiple channels into predictions.

To overcome these technical deficiencies, methods and systems disclosed herein enable the combination of heterogeneous and temporally unaligned data in a meaningful way that retains temporal relationships in the data, thereby improving the accuracy and reliability of predictions that are based on the data. The data may include structured multi-channel data composed of numerous entries that each contain data values for multiple fields (e.g., tabular data). The system may employ an encoder-decoder architecture for effectively combining heterogeneous data with sequential actions. For example, the system may combine multi-channel data by first flattening the data values, across entries, fields, and channels, to generate a single time-ordered sequence. This single time-ordered sequence resolves temporal irregularities that are present in the data across the multiple channels. Moreover, embeddings representing the names of the fields may be added to the encoder to provide channel and field awareness, thereby retaining nuanced relationships in the heterogeneous data that would otherwise be lost as a result of the flattening. The decoder may use the encoder's context as well as a sequence of past intents to generate an intent prediction, thereby further integrating heterogeneous data for the prediction. Both the encoder and the decoder may use a time relativity matrix and timestamp embeddings generated by a multi-dimensional time encoder to represent absolute and relative time dynamics between the multiple fields and the multiple channels, thereby enabling recognition of patterns relating to seasonality, periodicity, and other temporal behavior.

In this way, the encoder-decoder transformer model of the system provides contextual and sequential intent prediction by effectively and meaningfully combining heterogeneous and temporally unaligned multi-channel data. Thus, the system is capable of generating prediction outputs that account for temporal relationships and the multi-variate and multi-channel nature of the data, thereby improving the accuracy and reliability of the predictions. Additionally, the system eliminates the need for multi-level hierarchical modeling, thereby simplifying the architecture while facilitating learning of complex, deep, and rich patterns by direct interaction between cross-field and cross-channel dependencies over time.

In some aspects, a system may receive, over a computer network from a user device, a request to access over the computer network a chatbot system via a user interface. The system may retrieve responsive to the request and from one or more data sources: first data representing a plurality of activity sequences associated with a plurality of channels, where each activity sequence, of the plurality of activity sequences, includes a plurality of activity entries having data values for a plurality of fields, where the plurality of activity entries are associated with respective first timestamps, and where the plurality of activity sequences have respective temporal resolutions, and second data representing an intent sequence associated with past uses of the chatbot system, where the intent sequence includes a plurality of intent entries associated with respective second timestamps. The system may flatten the data values for the plurality of activity sequences, across the plurality of activity entries, the plurality of fields, and the plurality of channels, into a single time-ordered activity sequence. The system may generate activity data embeddings using the single time-ordered activity sequence and intent embeddings using the intent sequence. The system may generate first timestamp embeddings using the respective first timestamps, and second timestamp embeddings using the respective second timestamps. The system may construct a first time relativity matrix using the respective first timestamps, and a second time relativity matrix using the respective second timestamps. The system may generate, using an encoder module, an encoder output based on the activity data embeddings, the first timestamp embeddings, and the first time relativity matrix. The system may generate, using a decoder module, a decoder output based on the encoder output, the intent embeddings, the second timestamp embeddings, and the second time relativity matrix. The system may determine, based on the decoder output, a prediction of an intent for accessing the chatbot system via the user interface. The system may transmit, over the computer network, information to cause presentation in the user interface of a selected content based on the prediction of the intent.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
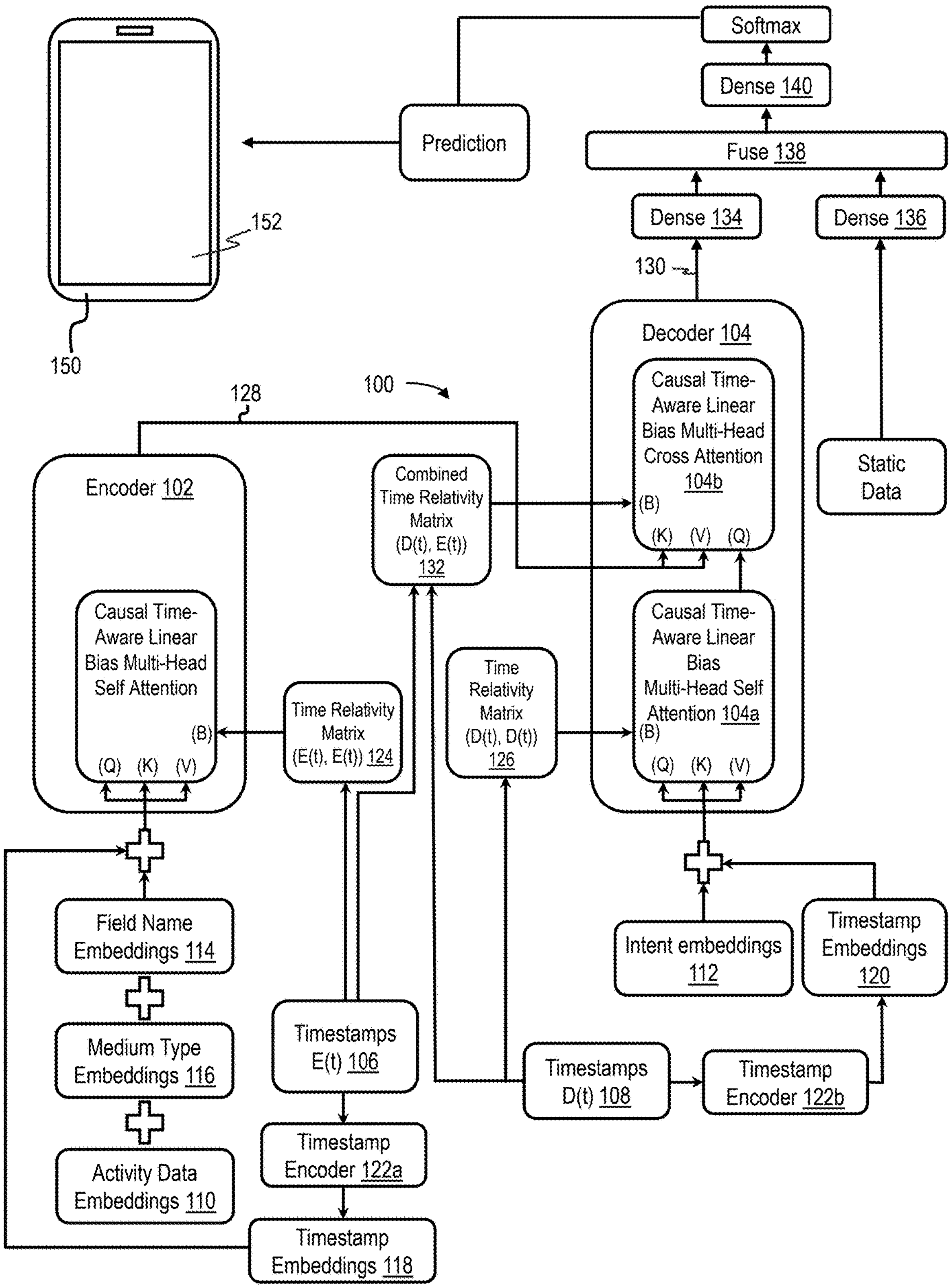
FIG. 1 shows an illustrative diagram for generating predictions from heterogeneous and temporally unaligned data using an encoder-decoder transformer, in accordance with one or more embodiments.

FIG. 1 shows an illustrative diagram for generating predictions from heterogeneous and temporally unaligned data using an encoder-decoder transformer, in accordance with one or more embodiments. FIG. 1 shows a system 100 (e.g., a machine learning system) and a user device 150 associated with a user. The system 100 may be, or may include, a question-and-answer system (e.g., a chatbot system), a call center system, a web application content system, a mobile application content system, or another type of system using artificial intelligence-based prediction or recommendation. The system 100, and/or one or more other devices, may collect data relating to the user's activities in multiple channels. "Channel" may refer to a medium through which activities, interactions, transactions, and/or data exchanges occur between a user and an entity. For example, the multiple channels may include an email channel, a web channel, a mobile application channel, a call center channel, a chat channel, and/or a physical store channel, among other examples. The activities may include performing a transaction (e.g., using a transaction card), making a payment, redeeming rewards points, engaging in a chat session, visiting a physical store, or submitting an application, among numerous other examples. In other contexts, the activities may relate to consuming content, browsing the Internet, driving a vehicle, or using a device, among other examples. The data relating to the user's activities may be timestamped to indicate a chronology of the activities. Moreover, data collection in each channel may use different data types (e.g., numerical data, string data, binary data, etc.), may use different fields or different quantities of fields, and/or may have different temporal resolutions (e.g., collected per minute, collected per session, collected per event, etc.). In other words, the data may be heterogeneous and temporally unaligned.

The system 100 may have an encoder-decoder transformer architecture, including an encoder module 102 and a decoder module 104. The encoder module 102 may include one or more encoders (e.g., machine learning encoder models), and the decoder module 104 may include one or more decoders (e.g., machine learning decoder models). The encoder module 102 and/or the decoder module 104 may include a recurrent neural network or a transformer. The encoder module 102 may be trained to receive input information and to condense the information into a compressed representation of the information (e.g., a high-dimensional vector). The decoder module 104 may be trained to generate a prediction using the compressed representation of the information from the encoder module 102. The prediction may relate to an intent of the user (e.g., an intent of the user in accessing a question-and-answer system or an intent of the user in calling a cell center), or another type of prediction, such as a prediction of an item (e.g., vehicle) that would be of interest to the user, a prediction of content that would be of interest to the user (e.g., content having a high probability of user engagement), a prediction of whether a transaction is fraudulent, a prediction of a charge-off of debt, a prediction of a computing and/or memory resource usage by the user, or a prediction of a computing and/or memory resource allocation for the user, among other examples. The encoder-decoder transformer may be trained using activity data sequences and/or intent sequences for numerous users. An activity sequence and intent sequence may be temporally split per user into training, validation, and test datasets for model training. A "sequence" may refer to an ordered list of tokens (e.g., that are numerically represented). "Tokens" may refer to words, sub-words, or characters in a sequence.

The user device 150 may include a user interface 152 that facilitates communication with the system 100 via a computer network. For example, the system 100 may be implemented at a resource (e.g., a server, a cloud service, an application, an application programming interface (API) endpoint, etc.), and the user interface 152 may facilitate communication to and from the resource. The system 100 may be remote from the user device 150, or in some examples, the user device 150 may include the system 100. As referred to herein, a "user interface" may comprise a human-computer interaction and communication in a device, and may include display screens, keyboards, a mouse, and the appearance of a desktop. For example, a user interface may comprise a way a user interacts with an application or a website. In some embodiments, the user interface 152 may be a question-and-answer system, or chatbot, user interface (e.g., the user interface 152 facilitates communication with the system 100 used for question-and-answer, or chatbot, functionality).

The system 100 may receive, from the user device 150 (e.g., over a computer network), a request to access a resource of the system 100 via the user interface 152. For example, the request may be to access a question-and-answer system of the system 100 via the user interface 152. In some examples, the request may be a hypertext transfer protocol (HTTP) request (e.g., to access a web page that includes an input element for the question-and-answer system). The user may seek to access the resource of the system 100 with a particular intent in mind. Thus, upon receiving the request to access the resource of the system 100, the system 100 may attempt to predict the user's intent, as described herein. For example, the user may seek to access a question-and-answer system of the system 100 in order to receive assistance for reporting fraud, making a payment, redeeming rewards points, or the like. By predicting, and thereby anticipating, the needs of the user, the system 100 may undertake various preparations in order to more efficiently conduct communications with the user device 150, thereby conserving resources of the computer network.

In response to the request, the system 100 may retrieve, from one or more data sources, data which can be used for making the prediction. For example, the data may relate to the user. The data sources may include one or more databases, one or more electronic files, one or more web pages, or the like. In some examples, to retrieve the data, the system 100 may transmit one or more requests for the data using one or more application programming interfaces (APIs), and may receive one or more responses that contain the data using the one or more APIs.

The system 100 may retrieve first data representing multiple activity sequences associated with the multiple channels. An activity sequence may be a time series of activity data (e.g., associated with the user) relating to one of the channels. For example, a first activity sequence may relate to a first channel (e.g., a web channel), a second activity sequence may relate to a second channel (e.g., a call center channel), and so forth. The first data may include tabular data representing the activity sequences. For example, each activity sequence may be represented by a set of activity entries each having data values in multiple fields (e.g., each activity entry may have its own combination of data values for the fields). The first data may be heterogeneous across the multiple channels. For example, a first activity sequence for a first channel may have different fields and/or a different number of fields than a second activity sequence for a second channel. Moreover, the activity entries of an activity sequence may be associated with respective first timestamps 106, thereby indicating the time order of the activity sequence. In addition, the activity sequences may have respective (e.g., nonuniform) temporal resolutions. For example, a first activity sequence relating to a first channel may have a first temporal resolution (e.g., activity entries may have been collected per minute), a second activity sequence relating to a second channel may have a second temporal resolution (e.g., activity entries may have been collected per session), and so forth. "Temporal resolution" may refer to a frequency or a timing pattern by which data is collected. A temporal resolution may be in periodic units (e.g., per minute, per hour, or the like) or may be non-periodic (e.g., per session, per event, or the like).

The system 100 may also retrieve second data representing an intent sequence associated with past user intents. For example, the intent sequence may be associated with past uses of the question-and-answer system of the system 100. As an example, the user may have a different intent (e.g., requesting an increase of a credit limit, reporting a dispute, redeeming reward points, etc.) each time the user accesses the question-and-answer system of the system 100. The intent sequence may include a plurality of intent entries (e.g., each intent entry indicating a past user intent) associated with respective second timestamps 108 (e.g., the intent sequence may be ordered in accordance with the second timestamps 108).

The system 100 may generate activity data embeddings 110 based on the first data. To do so, the system 100 may first flatten (e.g., organize in a one-dimensional representation) the data values for the activity sequences, across the activity entries, the fields, and the channels, into a single time-ordered activity sequence (e.g., the single activity sequence may be time ordered in accordance with the first timestamps 106). For example, the data values for all of the fields of a first-in-time activity entry among all of the activity sequences may be first in the single time-ordered activity sequence, the data values for all of the fields of a second-in-time activity entry among all of the activity sequences may be second in the single time-ordered activity sequence, and so forth. By flattening the first data in this way, temporal irregularities that are present in the first data across the multiple channels are resolved. Using the single time-ordered activity sequence, the system 100 may generate the activity data embeddings 110. The system 100 may also generate intent embeddings 112 based on the second data (e.g., the intent entries). For example, the system 100 may generate the intent embeddings 112 based on the intent sequence.

In some examples, the system 100 may generate field name embeddings 114 and/or medium type embeddings 116. "Medium type" may refer to a type of vehicle, mechanism, mode, or method in or through which an activity is performed. Due to flattening of the activity data, domain and field representations may be lost for some of the data values (e.g., it may be unclear whether a numerical value in the single time-ordered activity sequence is the data for an "amount" field or a "count" field). The field name embeddings 114 preserve the domain and field representations of the data values. Similarly, the medium type embeddings 116 indicate a respective medium type (e.g., an account type, a transaction type, a use type, or the like) associated with each activity entry of the activity data. For example, the user may own multiple accounts (e.g., a checking account, a credit card account, etc.), and the medium type embeddings 116 may represent correlations between the accounts and the activity data. The field name embeddings 114 and the medium type embeddings 116 may be ordered in accordance with the sequence of the activity data embeddings 110, thereby maintaining multi-dimensional relationships within the first data.

Additionally, the system 100 may generate first timestamp embeddings 118 using the first timestamps 106, and second timestamp embeddings 120 using the second timestamps 108. The system 100 may generate the timestamp embeddings 118, 120 using timestamp encoders 122*a*, 122*b* (e.g., which may be a single timestamp encoder used for both the first timestamps 106 and the second timestamps 108 or respective timestamp encoders for the first timestamps 106 and the second timestamps 108). The first timestamp embeddings 118 may be ordered in chronological order of the first timestamps 106 (which is also how the activity data embeddings 110 are ordered), thereby maintaining the time relationships within the first data. Similarly, the second timestamp embeddings 120 may be ordered in chronological order of the second timestamps 108 (which is also how the intent embeddings 112 are ordered), thereby maintaining the time relationships within the second data. The timestamp encoders 122*a*, 122*b* encode timestamps by transforming each timestamp into a vector representation that reflects the timestamp's absolute temporal significance within the sequence of events. The timestamp encoders 122*a*, 122*b* may use sinusoidal embeddings and/or learned embeddings to map each time unit (e.g., day, hour, minute) to a unique vector, thereby distinguishing specific moments in time. The timestamp embeddings 118, 120 capture sequence periodicity, seasonality, and frequent behavior, time representations based on multi-dimensional signals such as the day of the week, week of the month, and hour of the day.

To capture relative time relationships, the system 100 may generate a first time relativity matrix 124 using the first timestamps 106, and a second time relativity matrix 126 using the second timestamps 108. "Time relativity matrix" may refer to a data structure that represents the temporal relationships between timestamps in a sequence. The first time relativity matrix 124 indicates temporal relationships between the first timestamps 106, and the second time relativity matrix 126 indicates temporal relationships between the second timestamps 108. The time relativity matrices 124, 126 enable modification of an attention mechanism to include a bias based on relative time. Thus, the time relativity matrices 124, 126 can be added to attention scores to provide relative time bias. The time relativity matrices 124, 126 are part of a time-aware linear bias technique used by the system 100 to encode temporal information in sequential data. This time-aware linear bias technique provides a learnable, decaying bias to the attention mechanism that emphasizes the relative temporal distance between events. As events become more distant in time, the attention paid to them gradually decreases, enabling greater focus on recent events. The system 100 may generate the time relativity matrices 124, 126 using a function to capture the relativity of time, where E(t) denotes the time associated with the encoder sequence and D(t) denotes the time associated with the decoder sequence.

As shown, the system 100, using the encoder module 102, may generate an encoder output 128 (e.g., an encoded context). The encoder output 128 may be based on the activity data embeddings 110, the field name embeddings 114, the medium type embeddings 116, the first timestamp embeddings 118, and/or the first time relativity matrix 124. For example, the system 100 may add the activity data embeddings 110, the field name embeddings 114, the medium type embeddings 116, and/or the first timestamp embeddings 118 at an input of the encoder module 102. Moreover, the encoder module 102 may use the first time relativity matrix 124 in connection with a self-attention mechanism. The self-attention mechanism allows each token in the input sequence to weigh the importance of other tokens relative to itself, enabling the encoder module 102 to capture context and dependencies across the entire input. By calculating similarity scores between each token's query and every other token's key, the mechanism assigns attention weights, which are then used to scale corresponding value vectors.

For example, the encoder module 102 may use causal time-aware linear bias multi-head self-attention. The encoder module 102 may process the input sequence (e.g., the added activity data embeddings 110, field name embeddings 114, medium type embeddings 116, and first timestamp embeddings 118) by applying self-attention and feed-forward transformations. The input sequence may be input to the encoder module 102 as a queries (Q) matrix, a keys (K) matrix, and a values (V) matrix. These matrices enable the encoder module 102 to compute attention scores that determine the relevance of each token in the sequence relative to others.

The encoder module 102 may apply a temporal causal mask based on relative time (e.g., the first time relativity matrix 124). For example, the attention mechanism of the encoder module 102 may be modified to include a bias (B) based on relative time. Before computing final attention scores, the first time relativity matrix 124 is added to the attention scores, which may be followed by applying the softmax function for score normalization as follows:

$$softmax\left(\frac{q_i K^T + s\cdot[t(q_i) - t(k_j) \mid i \in \{1, \ldots, n\}, j \in \{1, \ldots, m\}]}{\sqrt{d_k}}\right)\cdot V$$

where V is the value matrix, qi is the i-th query, K is the key matrix, n is the query sequence length, m is the key sequence length, and s is the slope parameter.

As shown, the system 100, using the decoder module 104, may generate a decoder output 130. The decoder output 130 may be based on the encoder output 128. For example, the decoder output 130 may be based on the encoder output 128, the intent embeddings 112, the second timestamp embeddings 120, and/or the second time relativity matrix 126. In some examples, the decoder output 130 may be further based on a combined time relativity matrix 132, which may be based on the first timestamps 106 and the second timestamps 108 (e.g., based on the first time relativity matrix 124 and the second time relativity matrix 126). For example, the system 100 may add the intent embeddings 112 and/or the second timestamp embeddings 120 at an input of the decoder module 104. Moreover, the decoder module 104 may use the second time relativity matrix 126 in connection with a self-attention mechanism, in a similar manner as described above.

For example, the decoder module 104 may use causal time-aware linear bias multi-head self-attention in combination with causal time-aware linear bias multi-head cross-attention. In each decoding step, the decoder module 104 may process queries (Q), which represent a current token's context, keys (K) and values (V) from previous tokens in the output (e.g., via self-attention), and keys and values from the encoder module 102 (e.g., via encoder-decoder cross attention). For example, at a first stage 104*a* (e.g., a self module of the decoder module 104), the decoder module 104 may process the intent embeddings 112 and the second timestamp embeddings 120 applying a temporal causal mask based on relative time (e.g., the second time relativity matrix 126) to generate a first stage output. As an example, the self-attention mechanism of the decoder module 104 may be modified to include a bias (B) based on relative time. Before computing final attention scores, the second time relativity matrix 126 is added to the attention scores, which may be followed by applying the softmax function for score normalization, in a similar manner as described above. At a second stage 104*b* (e.g., a cross module of the decoder module 104), the decoder module 104 may process the first stage output and the encoder output 128 applying a temporal causal mask based on relative time (e.g., the combined time relativity matrix 132) to generate a second stage output (which is, or is used for, the decoder output 130). In particular, the cross-attention mechanism uses queries ($q_i$) from the intent self-attention, keys ($k_j$), and values ($v_i$) from the encoder output 128. Further the cross-attention mechanism applies a causal mask based on the combined time relativity matrix 132 (e.g., a function of (D(t), E(t)) to include a bias (B) based on relative time. In this way, a time-based attention mask for cross-attention in the decoder module 104 is employed to dynamically attend to causal tokens for learning temporal patterns between intent and the context.

The system 100 may process the decoder output 130 (representing dynamic data) in a dense layer 134, and static data for the user may be processed by the system 100 in a dense layer 136. The static data may be medium type enrollment data for the user (e.g., indicating the types of accounts in which the user is enrolled). The resultant outputs of the dense layer 134 (e.g., a final decoder output) and the dense layer 136 may be fused at a fuse layer 138 (e.g., for point-in-time representation with the decoder output 130). In this way, the system 100 provides fusing of dynamic data and static data to capture both dynamic patterns, and static patterns replicated across a sequence for elongated periods, thereby eliciting more accurate outputs. As an example, to identify point-in-time product ownership of the user (or another point-in-time characteristic relating to the user) in the decoder module 104, a product one-hot encoding is first passed through the dense layer 136 and then fused with the final decoder output from the dense layer 134. The resultant output of the fuse layer 138 may be processed by the system 100 in a further dense layer 140, and the system 100 may apply the softmax function to the resultant output of the dense layer 140 to obtain a final output. The system 100 may determine a prediction based on the decoder output 130 and/or the final output, such as a prediction of an intent of the user (e.g., an intent of the user for accessing the question-and-answer system of the system 100).

The system 100 may generate content based on the output (e.g., the decoder output 130 or the final output). For example, the content may include text and/or graphics that are based on the prediction. As an example, based on a particular predicted intent of the user, the system 100 may generate content related to that intent (e.g., content personalization). For example, if the intent is a first intent (e.g., redeeming rewards points), then the system 100 may generate first content related to the first intent (e.g., content including an explanation of how to redeem rewards points, links to resources for redeeming rewards points, a form used to redeem rewards points, etc.), and if the intent is a second intent (e.g., making a payment), then the system 100 may generate second content related to the second intent (e.g., content including a payment among that is due, an explanation of how to make a payment, links to resources for making a payment, etc.). As another example, the system may generate content in a particular order (e.g., ranking), or may re-order content, based on a predicted intent. For example, if the intent is a first intent (e.g., redeeming rewards points), then the system 100 may generate content in a first order relevant to the first intent (e.g., an order that prioritizes modules of the content relating to rewards points), and if the intent is a second intent (e.g., making a payment), then the system 100 may generate content in a second order relevant to the second intent (e.g., an order that prioritizes modules of the content relating to making payments). The system 100 may output the generated content for presentation in the user interface 152. For example, the system 100 may transmit the generated content over the computer network to the user device 150 to cause presentation of the content in the user interface 152.

As one example, the system 100 may predict an intent of the user in accessing the question-and-answer system, and the system 100 may select content (e.g., from a content library or may generate the content using a language model) based on the intent. For example, the content may include one or more questions that the user is predicted to be accessing the question-and-answer system to ask and/or may include answers to the one or more questions. The system 100 may transmit (e.g., over the computer network) information to cause presentation in the user interface 152 of the selected content. In this way, the prediction of the intent can be used to reduce the amount of back-and-forth communication between the system 100 and the user device 150, thereby conserving network resources.

Figure 2:
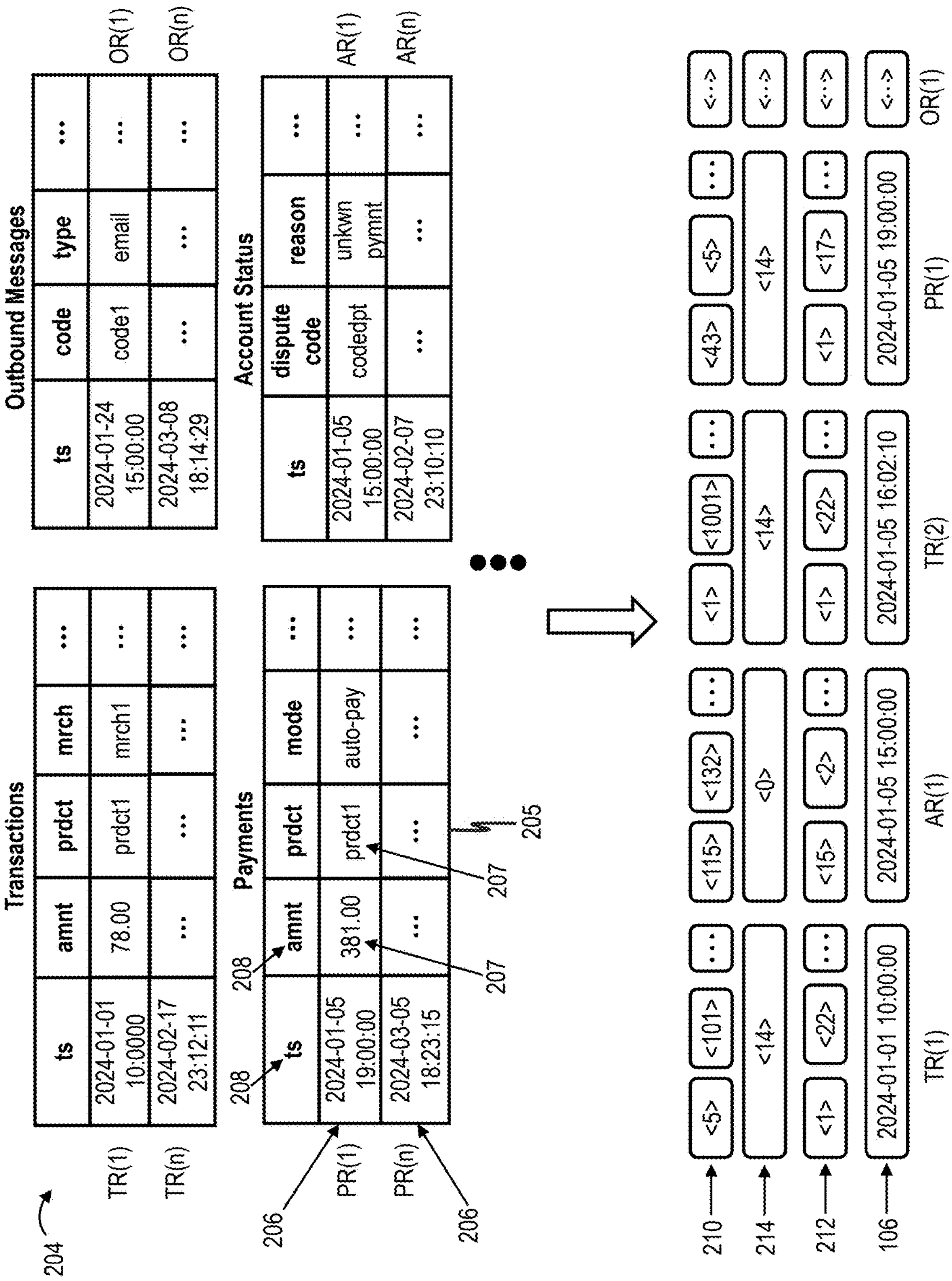
FIG. 2 shows an illustrative diagram for processing heterogeneous and temporally unaligned data using data flattening, in accordance with one or more embodiments.

FIG. 2 shows an illustrative diagram for processing heterogeneous and temporally unaligned data using data flattening, in accordance with one or more embodiments. The user's activities in multiple domains (e.g., a transactions domain, a payments domain, a rewards domain, and/or chatbot query domain) may be represented as discrete timelines of data. The data may be heterogeneous and may have nonuniform temporal resolutions. The sequential intent prediction techniques described herein aim to forecast user actions based on inputs from diverse domains. For example, for n domains, $X=[X_1, X_2, \ldots, X_n]$, where $X_i$ denotes different types of interactions, such as credit card/debit card transactions, payments, rewards, account status, customer care messages, call center intents, or digital page views, among other examples. Each $X_i$ is a time series represented as $[X_{i1}, X_{i2}, \ldots, X_{it}]$. The sequential intent prediction techniques described herein may be used to predict future intents of the user $Y=[y_1, y_2, \ldots, y_k]$, at a given time t, given a context X and the prior sequence of intents of the user Y.

Reference number 204 shows the data values from the timelines collected in a tabular format (e.g., the first data representing multiple activity sequences ($X_i$)). For example, a table 205 (e.g., representing an activity sequence) may include multiple entries 206 each having data values 207 in multiple fields 208. As described herein, the system 100 may flatten the data values 207 for the sequences, across the entries 206, the fields 208, and the channels (shown as "transactions," "payments," "outbound messages," and "account status"), into a single time-ordered sequence 210. As an example, to flatten the data values 207, the system 100 may first quantile discretize continuous values (e.g., numerical values) of the data values to obtain data values 207 that includes binned data values, and the system 100 may then flatten the data values 207 that include the binned data values. Moreover, the system 100 may tokenize the data values 207 (e.g., including the binned data values) in the single time-ordered sequence 210 to obtain the single time-ordered sequence 210 containing tokenized data values, and the system 100 may generate data value embeddings based on the single time-ordered sequence 210 containing tokenized data values.

In order to retain the names of the fields 208 associated with the data values 207, the system 100 may also flatten field name values corresponding to the fields 208, across the multiple channels, into a single field name sequence 212 having a corresponding order to the single time-ordered sequence 210 (e.g., ordered by timestamp). For example, field names and domains names may be encoded as <field name+domain>. The system 100 may then generate field name embeddings using the single field name sequence 212, and combine the field name embeddings with the data value embeddings. For example, the encoded field names and domain names may be string-tokenized and embedded before being added to the single time-ordered sequence 210. In order to retain medium types (e.g., products) associated with the data values 207, the system 100 may also flatten medium type values corresponding to the entries 206, across the multiple channels, into a single medium type sequence 214 having a corresponding order with the single time-ordered sequence 210 (e.g., ordered by timestamp). The system 100 may then generate medium type embeddings using the single medium type sequence, and combine the medium type embeddings with the data value embeddings.

As an example, for each data source (e.g., each channel/domain), the system 100 may first quantile-discretize each numerical field in bins and convert the field to a string. Then, the system 100 may combine and collapse different data sources together, and finally, the system 100 may sort the resultant data by their respective timestamps. This results in X(u), with u representing the user and n the sequence length:

$$[(t_i, \ldots, t_n), (fn_i, \ldots, fn_n), (fv_i, \ldots, fv_n), (p_i, \ldots, p_n)]$$

where t is the timestamp, fn is the field name, fv is the field value, and p is the product (e.g., medium type). The system 100 may string-tokenize all fields in X except the timestamp. Similarly, sequences of intents are sorted by timestamp are string tokenized resulting in Y(u):

$$[(t_i, \ldots, t_n), (y_i, \ldots, y_n)]$$

where t is the timestamp and y is the intent.

Figure 3:
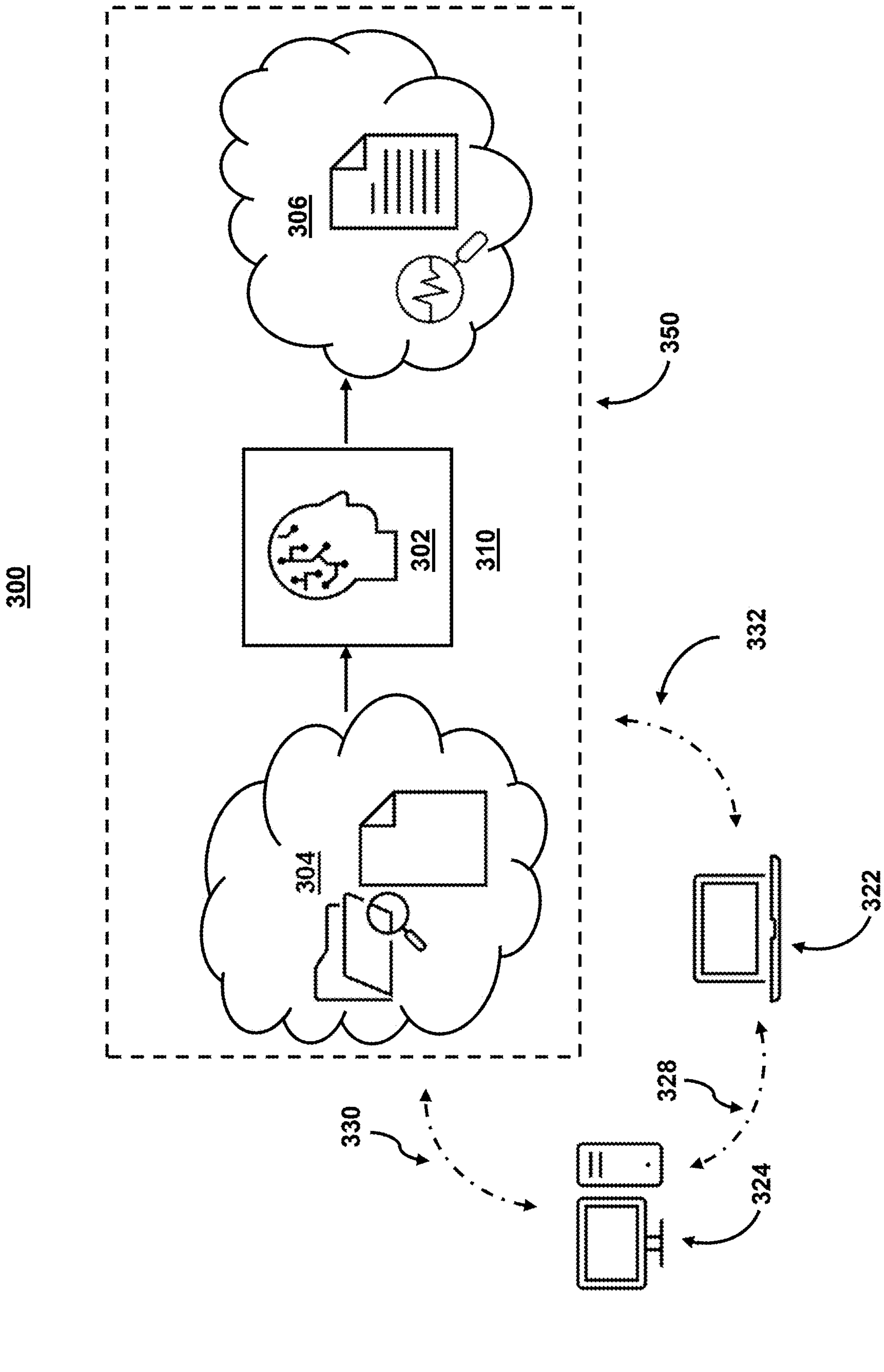
FIG. 3 shows illustrative components for a system used to harmonize temporal nonuniformity in multi-variate and multi-channel data for prediction generation, in accordance with one or more embodiments.

FIG. 3 shows illustrative components for a system used to harmonize temporal nonuniformity in multi-variate and multi-channel data for prediction generation, in accordance with one or more embodiments. For example, FIG. 3 may show illustrative components for generating predictions from heterogeneous and temporally unaligned data. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include the system 100. Cloud components 310 may access one or more databases that contain historical user activity data, historical user intent data, or a set of possible intents that can be selected from for an intent prediction. Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a prediction of an intent of a user in accessing a chatbot system).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., an intent classification).

In some embodiments, the model (e.g., model 302) may automatically perform actions based on outputs 306. In some embodiments, the model (e.g., model 302) may not perform any actions. The output of the model (e.g., model 302) may be used to generate content (e.g., explanatory content, graphical content, hyperlink content, form content, or the like) for presentation in a user interface, such as a web browser or a mobile application. For example, the content may be one or more pre-determined questions and/or answers for a question-and-answer system.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
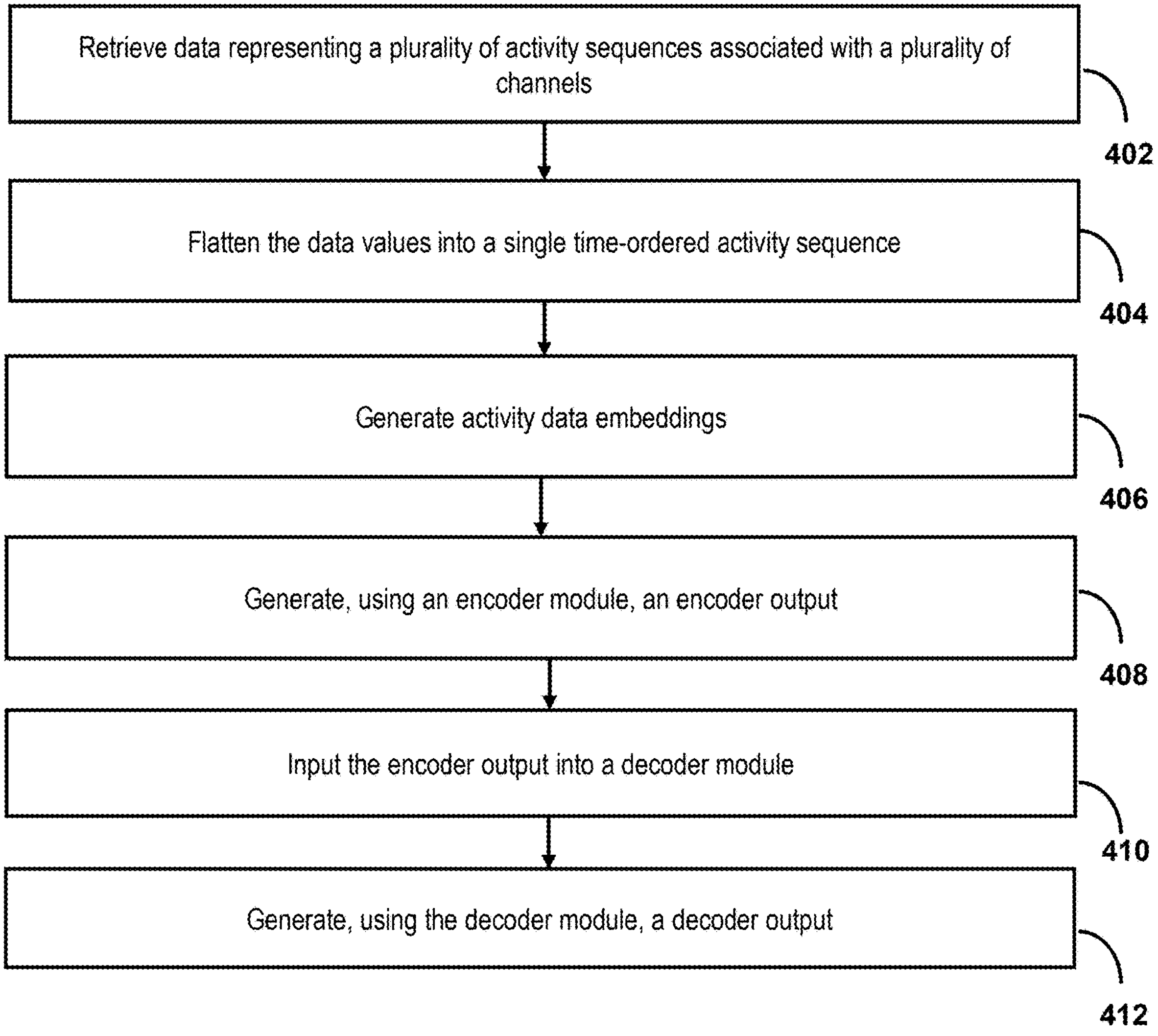
FIG. 4 shows a flowchart of the steps involved in harmonizing temporal nonuniformity in multi-variate and multi-channel data for prediction generation, in accordance with one or more embodiments.

FIG. 4 shows a flowchart of the steps involved in harmonizing temporal nonuniformity in multi-variate and multi-channel data for prediction generation, in accordance with one or more embodiments. For example, the system may use process 400 (e.g., as implemented on one or more system components described above) in order to generate predictions from heterogeneous and temporally unaligned data.

At step 402, process 400 (e.g., using one or more components described above) may include retrieving data representing a plurality of activity sequences associated with a plurality of channels. For example, the system (e.g., system 100 (FIG. 1)) may retrieve, from one or more data sources, first data representing a plurality of activity sequences associated with a plurality of channels and second data representing an intent sequence. Each activity sequence, of the plurality of activity sequences, may include a plurality of activity entries (e.g., entries 206 (FIG. 2)) having data values (e.g., data values 207 (FIG. 2)) for a plurality of fields (e.g., fields 208 (FIG. 2). Thus, the first data may be heterogeneous and multi-variate across the multiple channels. The plurality of activity entries may be associated with respective first timestamps (e.g., that indicate a respective time for each entry). The plurality of activity sequences may have respective temporal resolutions (e.g., one activity sequence may be composed of entries collected per second, while another activity sequence may be composed of entries collected per user session). The first data and the second data may be associated with a user. For example, data relating to interactions of the user in a particular channel or domain (e.g., a web channel, an email channel, a call center channel, a transactions domain, a payments domain, a rewards domain, or the like) may be recorded with a timestamp in a respective data source (e.g., a database or database table). By retrieving data representing user interactions across multiple channels and data sources, the system may build a robust dataset that enables more accurate intent prediction.

At step 404, process 400 (e.g., using one or more components described above) may include flattening the data values into a single time-ordered activity sequence (e.g., single time-ordered sequence 210 (FIG. 2)). For example, the system may flatten the data values for the plurality of activity sequences, across the plurality of activity entries, the plurality of fields, and the plurality of channels, into a single time-ordered activity sequence. As an example, tabular data representing the activity entries may be reformatted into sequential data, ordered by timestamp, that spans across the multiple channels. By doing so, the system may integrate heterogeneous data from various data sources (e.g., having different tabular schema, different data types, etc.) into a single encoder input, thus eliminating the need for multi-level hierarchical modeling.

In some embodiments, flattening the data values may include quantile discretizing continuous values of the data values to obtain the data values that include binned data values, and flattening the data values that include the binned data values. For example, the system may transform continuous data values into discrete bins before flattening the data values into the single time-ordered activity sequence for the encoder input. Doing so allows the system to efficiently encode patterns and relationships in the data without being affected by minor variations or noise in the continuous inputs, thereby allowing the encoder to process a simplified and structured input that improves the encoder's ability to identify and generalize relevant features.

At step 406, process 400 (e.g., using one or more components described above) may include generating activity data embeddings. For example, the system may generate activity data embeddings (e.g., activity data embeddings 110 (FIG. 1)) using the single time-ordered activity sequence. The system may generate the activity data embeddings to represent the single time-ordered activity sequence in a format suitable for interpretation by the encoder. For example, the activity data embeddings may be generated for each token in the sequence based on the token's identity, position, and/or segment within the sequence. The activity data embeddings transform high-dimensional data into dense, lower-dimensional vectors, thereby allowing the encoder to process complex data with improved efficiency and effectiveness.

In some embodiments, generating the activity data embeddings may include tokenizing the data values in the single time-ordered activity sequence, and generating the activity data embeddings based on the tokenized data values. For example, the system may tokenize the data values in the single time-ordered activity sequence to obtain the single time-ordered activity sequence containing tokenized data values, and generate the activity data embeddings based on the single time-ordered activity sequence containing the tokenized data values. The system may tokenize the data values by converting each data value (or sub-units thereof) into a unique token that can be processed by the encoder. The tokenization enables the data to be converted into manageable, model-compatible units that allow for efficient processing and analysis by the model.

In some embodiments, process 400 may include flattening field name values corresponding to the plurality of fields into a single field name sequence, generating field name embeddings using the single field name sequence, and combining the field name embeddings with the activity data embeddings. For example, the system may flatten field name values corresponding to the plurality of fields, across the plurality of channels, into a single field name sequence (e.g., field name sequence 212 (FIG. 2)) having a corresponding order to the single time-ordered activity sequence, generate field name embeddings using the single field name sequence, and combine the field name embeddings with the activity data embeddings at an input of the encoder. For example, the system may add or concatenate the respective vectors of the activity data embeddings and the field name embeddings into a unified representation. Doing so preserves multi-dimensional relationships between the data values and their corresponding fields, thereby providing richness to the encoder input and improving the capture of contextual information by the encoder.

In some embodiments, process 400 may include flattening medium type values corresponding to the plurality of activity entries into a single medium type sequence, generating medium type embeddings using the single medium type sequence, and combining the medium type embeddings with the activity data embeddings. For example, the system may flatten medium type values corresponding to the plurality of activity entries, across the plurality of channels, into a single medium type sequence (e.g., medium type sequence 214 (FIG. 2)) having a corresponding order to the single time-ordered activity sequence, generate medium type embeddings using the single medium type sequence, and combine the medium type embeddings with the activity data embeddings at an input of the encoder. For example, the system may add or concatenate the respective vectors of the activity data embeddings and the medium type embeddings into a unified representation. As another example, the system may add or concatenate the respective vectors of the activity data embeddings, the field name embeddings, and the medium type embeddings into a unified representation. The medium types may represent a particular domain, a particular account, or a particular use case associated with the data values. For example, in transaction activity data, a first type of account (e.g., a checking account) may be the medium for a first transaction entry, and a second type of account (e.g., a credit card account) may be the medium for a second transaction entry. Accordingly, the medium type embeddings preserve multi-dimensional relationships between the data values and their corresponding mediums, thereby providing richness to the encoder input and improving the capture of contextual information by the encoder.

At step 408, process 400 (e.g., using one or more components described above) may include generating, using an encoder module, an encoder output. For example, the system may generate, using an encoder module (e.g., encoder module 102 (FIG. 1)), an encoder output based on the activity data embeddings and temporal information based on the respective timestamps for the activity data entries. In some examples, the system may generate the encoder output based on the added/concatenated activity data embeddings, field name embeddings, and/or medium type embeddings. The encoder output provides a rich, context-aware representation of the input data that captures complex relationships in the sequence, thereby improving the accuracy of the final prediction output.

In some embodiments, generating the encoder output may include generating the encoder output based on the activity data embeddings (e.g., the activity data embeddings, the field name embeddings, and/or the medium type embeddings), timestamp embeddings, and a time relativity matrix. For example, the system may generate, using a timestamp encoder model (e.g., timestamp encoder 122*a* (FIG. 1)), timestamp embeddings (e.g., timestamp embeddings 118 (FIG. 1)) based on the respective timestamps for the activity data entries. In some examples, the system may add or concatenate the respective vectors of the activity data embeddings and the timestamp embeddings into a unified representation. As another example, the system may add or concatenate the respective vectors of the activity data embeddings, the field name embeddings, the medium type embeddings, and/or the timestamp embeddings into a unified representation. The system may construct the time relativity matrix to indicate temporal relationships between the respective timestamps. In some embodiments, generating the encoder output may include applying a causal mask (e.g., the time relativity matrix) for processing of the unified representation of the activity data embeddings, the field name embeddings, the medium type embeddings, and/or the timestamp embeddings. For example, generating the encoder output may include generating the encoder output using a self-attention mechanism that uses the time relativity matrix. The time information (e.g., the timestamp embeddings and/or the time relativity matrix) provides representation of absolute and relative time dynamics between the multiple fields and the multiple channels, thereby enabling recognition of patterns relating to seasonality, periodicity, and other temporal behavior. By incorporating absolute and relative time dynamics, the accuracy of the final prediction output is improved.

At step 410, process 400 (e.g., using one or more components described above) may include inputting the encoder output into a decoder module. For example, the system may input the encoder output as well as intent embeddings (e.g., intent embeddings 112 (FIG. 1)) into the decoder module (e.g., decoder module 104 (FIG. 1)). By doing so, the decoder may generate more precise and contextually relevant intent predictions by leveraging intent data and the contextualized information learned from the encoder. In some embodiments, process 400 may include generating the intent embeddings based on the plurality of intent entries of the intent sequence. The intent embeddings transform high-dimensional data into dense, lower-dimensional vectors, thereby allowing the decoder to process complex data with improved efficiency and effectiveness.

At step 412, process 400 (e.g., using one or more components described above) may include generating, using the decoder module, a decoder output. For example, the system may generate, using the decoder module, a decoder output based on the encoder output. In some embodiments, generating the decoder output may include generating the decoder output using the encoder output, the intent embeddings, timestamp embeddings, and/or a time relativity matrix. For example, the system may generate, using a timestamp encoder model (e.g., timestamp encoder 122*b* (FIG. 1)), timestamp embeddings (e.g., timestamp embeddings 120 (FIG. 1)) based on the respective timestamps for the intent entries. In some examples, the system may add or concatenate the respective vectors of the intent embeddings and the timestamp embeddings into a unified representation. The system may construct the time relativity matrix to indicate temporal relationships between the respective timestamps. In some embodiments, generating the decoder output may include applying a causal mask (e.g., the time relativity matrix) for processing of the unified representation of the intent embeddings and/or the timestamp embeddings. For example, generating the encoder output may include generating a first stage encoder output using a self-attention mechanism that uses the time relativity matrix (e.g., the first stage encoder output is based on the intent embeddings, the timestamp embeddings, and/or the time relativity matrix). The timestamp embeddings and the time relativity matrix provide a representation of absolute and relative time dynamics between historical intents, thereby enabling recognition of patterns relating to seasonality, periodicity, and other temporal behavior. By incorporating absolute and relative time dynamics, the accuracy of the final prediction output is improved.

In some embodiments, process 400 may include generating a combined time relativity matrix based on the respective first timestamps and the respective second timestamps. Moreover, generating the encoder output may include generating a second stage output, based on the first decoder output, using a cross-attention mechanism that uses the combined time relativity matrix (e.g., the second decoder output is based on the first decoder output, the encoder output, and the combined time relativity matrix). By doing so, the decoder may focus on relevant parts of the encoder's output in a time-aware manner, allowing for more precise and contextually appropriate predictions by leveraging both the intent input sequence and the learned representations from the encoder. This improves the model's ability to capture dependencies between input and output sequences, thereby producing highly accurate intent predictions.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for processing heterogeneous and temporally unaligned data.
2. The method of embodiment 1 comprising: retrieving, by a device from one or more data sources, data representing a plurality of activity sequences associated with a plurality of channels, wherein each activity sequence, of the plurality of activity sequences, includes a plurality of activity entries having data values for a plurality of fields, wherein the plurality of activity entries are associated with respective timestamps, and wherein the plurality of activity sequences have respective temporal resolutions; flattening, by the device, the data values for the plurality of activity sequences, across the plurality of activity entries, the plurality of fields, and the plurality of channels, into a single time-ordered activity sequence; generating, by the device, activity data embeddings using the single time-ordered activity sequence; generating, by the device using an encoder module, an encoder output based on the activity data embeddings and temporal information based on the respective timestamps; inputting, by the device, the encoder output into a decoder module; and generating, by the device using the decoder module, a decoder output based on the encoder output.
3. The method of embodiment 2, further comprising: flattening field name values corresponding to the plurality of fields, across the plurality of channels, into a single field name sequence having a corresponding order to the single time-ordered activity sequence; generating field name embeddings using the single field name sequence; and combining the field name embeddings with the activity data embeddings for an input to the encoder module.
4. The method of any of embodiments 2-3, further comprising: flattening medium type values corresponding to the plurality of activity entries, across the plurality of channels, into a single medium type sequence having a corresponding order with the single time-ordered activity sequence; generating medium type embeddings using the single medium type sequence; and combining the medium type embeddings with the activity data embeddings for an input to the encoder module.
5. The method of any of embodiments 2-4, further comprising: generating, using a timestamp encoder model, timestamp embeddings based on the respective timestamps; and constructing a time relativity matrix indicating temporal relationships between the respective timestamps.
6. The method of embodiment 5, wherein generating the encoder output based on the activity data embeddings and the temporal information comprises: generating the encoder output based on the activity data embeddings, the timestamp embeddings, and the time relativity matrix.
7. The method of embodiment 6, wherein generating the encoder output comprises: generating the encoder output using a self-attention mechanism that uses the time relativity matrix.
8. The method of any of embodiments 2-7, wherein flattening the data comprises: quantile discretizing continuous values of the data values to obtain the data values that include binned data values; and flattening the data values that include the binned data values.
9. The method of any of embodiments 2-8, wherein generating the activity data embeddings comprises: tokenizing the data values in the single time-ordered activity sequence to obtain the single time-ordered activity sequence containing tokenized data values; and generating the activity data embeddings based on the single time-ordered activity sequence containing the tokenized data values.
10. The method of any of embodiments 2-9, wherein generating the encoder output comprises: applying a causal mask for processing of the activity data embeddings.
11. The method of any of embodiments 2-10, wherein the data is first data and the respective timestamps are respective first timestamps, and wherein retrieving the data comprises: retrieving, from the one or more data sources, the first data and second data representing an intent sequence associated with past user intents, wherein the intent sequence includes a plurality of intent entries associated with respective second timestamps.
12. The method of embodiment 11, further comprising: generating intent embeddings based on the plurality of intent entries of the intent sequence; generating, using a timestamp encoder model, timestamp embeddings based on the respective second timestamps; and constructing a time relativity matrix indicating temporal relationships between the respective second timestamps.
13. The method of embodiment 12, wherein generating the decoder output comprises: generating the decoder output using the encoder output, the intent embeddings, the timestamp embeddings, and the time relativity matrix.

14. The method of any of embodiments 12-13, further comprising generating a combined time relativity matrix based on the respective first timestamps and the respective second timestamps, wherein generating the decoder output comprises: generating a first stage output based on the intent embeddings, the timestamp embeddings, and the time relativity matrix; and generating a second stage output based on the first stage output, the encoder output, and the combined time relativity matrix.

15. The method of embodiment 14, wherein generating the first stage output comprises generating the first stage output using a self-attention mechanism that uses the time relativity matrix, and wherein generating the second stage output comprises generating the second stage output, based on the first stage output, using a cross-attention mechanism that uses the combined time relativity matrix.

16. One or more non-transitory, computer-readable mediums storing instructions that, when executed by a data processing apparatus, cause the data processing apparatus to perform operations comprising those of any of embodiments 1-15.

17. A system comprising one or more processors; and memory storing instructions that, when executed by the processors, cause the processors to effectuate operations comprising those of any of embodiments 1-15.

18. A system comprising means for performing any of embodiments 1-15.

What is claimed is:

1. A system for transmitting a temporally-based chatbot output from heterogeneous and temporally unaligned data, the system comprising:

one or more memories; and one or more processors, communicatively coupled to the one or more memories, configured to:

receive, over a computer network from a user device, a request to access over the computer network a chatbot system via a user interface;

transmit, based on the request, one or more application programming interface (API) requests to one or more databases to retrieve from the one or more databases:

first structured data representing a plurality of activity sequences associated with a plurality of channels, wherein each activity sequence, of the plurality of activity sequences, includes a plurality of activity entries having data values for a plurality of fields, wherein the plurality of activity entries are associated with respective first timestamps, and wherein the plurality of activity sequences have respective temporal resolutions, and second data representing an intent sequence associated with past uses of the chatbot system, wherein the intent sequence includes a plurality of intent entries associated with respective second timestamps;

flatten (i) the data values for the plurality of activity sequences, across the plurality of activity entries, the plurality of fields, and the plurality of channels, into a single time-ordered activity sequence by reformatting tabular data representing the data values into sequential data ordered by timestamp across the plurality of channels, quantile discretizing continuous data values into discrete bins before flattening the data values into the single time-ordered activity sequence, and tokenizing the data values by converting the data values into tokens for processing by an encoder, thereby providing a simplified single encoder input that enables processing of heterogeneous data from multiple data sources, and (ii) field name values corresponding to the plurality of fields, across the plurality of channels, into a single field name sequence having a corresponding order to the single time-ordered activity sequence;

generate activity data embeddings using the single time-ordered activity sequence, field name embeddings using the single field name sequence, intent embeddings using the intent sequence, first timestamp embeddings using the respective first timestamps, and second timestamp embeddings using the respective second timestamps;

execute an encoder-decoder transformer to generate, using the encoder of the encoder-decoder transformer, an encoder output based on a unified representation of the activity data embeddings, the field name embeddings, and the first timestamp embeddings, and based on a first time relativity matrix constructed using the respective first timestamps, and to generate, using a decoder of the encoder-decoder transformer, a decoder output based on the encoder output, based on a second unified representation of the intent embeddings and the second timestamp embeddings, and based on a second time relativity matrix constructed using the respective second timestamps;

determine, based on the decoder output, a prediction of an intent for accessing the chatbot system via the user interface; and transmit, over the computer network, information to cause presentation in the user interface of a selected content based on the prediction of the intent.

2. A method for processing heterogeneous and temporally unaligned data, the method comprising:

retrieving, by a device from one or more data sources, structured data associated with a user and representing a plurality of activity sequences associated with a plurality of channels, wherein each activity sequence, of the plurality of activity sequences, includes a plurality of activity entries having data values for a plurality of fields, wherein the plurality of activity entries are associated with respective timestamps, and wherein the plurality of activity sequences have respective temporal resolutions;

flattening, by the device, (i) the data values for the plurality of activity sequences, across the plurality of activity entries, the plurality of fields, and the plurality of channels, into a single time-ordered activity sequence by reformatting tabular data representing the data values into sequential data ordered by timestamp across the plurality of channels, quantile discretizing continuous data values into discrete bins before flattening the data values into the single time-ordered activity sequence, and tokenizing the data values by converting the data values into tokens for processing by an encoder, thereby providing a simplified single encoder input that enables processing of heterogeneous data from multiple data sources, and (ii) field name values corresponding to the plurality of fields, across the plurality of channels, into a single field name sequence having a corresponding order to the single time-ordered activity sequence;

generating, by the device, (i) activity data embeddings using the single time-ordered activity sequence, and (ii) field name embeddings using the single field name sequence;

executing, by the device, an encoder-decoder transformer to generate, using the encoder of the encoder-decoder transformer, an encoder output based on a unified representation of the activity data embeddings and the field name embeddings and based on temporal information based on the respective timestamps, and to generate, using a decoder of the encoder-decoder transformer, a decoder output based on the encoder output;

determining, based on the decoder output, a prediction of an intent associated with the user; and transmitting information to cause presentation in a user interface of a selected content based on the prediction of the intent.

3. The method of claim 2, further comprising:

combining the field name embeddings with the activity data embeddings into the unified representation for an input to the encoder.

4. The method of claim 2, further comprising:

flattening medium type values corresponding to the plurality of activity entries, across the plurality of channels, into a single medium type sequence having a corresponding order with the single time-ordered activity sequence;

generating medium type embeddings using the single medium type sequence; and combining the medium type embeddings with the activity data embeddings for an input to the encoder.

5. The method of claim 2, further comprising:

generating, using a timestamp encoder model, timestamp embeddings based on the respective timestamps; and constructing a time relativity matrix indicating temporal relationships between the respective timestamps.

6. The method of claim 5, wherein executing the encoder-decoder transformer comprises:

executing the encoder-decoder transformer to generate, using the encoder, the encoder output based on the unified representation of the activity data embeddings, the field name embeddings, and the timestamp embeddings, and based on the time relativity matrix.

7. The method of claim 6, wherein executing the encoder-decoder transformer comprises:

generating the encoder output using a self-attention mechanism that uses the time relativity matrix.

8. The method of claim 2, wherein flattening the data values comprises:

flattening the data values that include binned data values based on the quantile discretizing.

9. The method of claim 2, wherein generating the activity data embeddings comprises:

generating the activity data embeddings based on the single time-ordered activity sequence containing tokenized data values based on the tokenizing.

10. The method of claim 2, wherein executing the encoder-decoder transformer comprises:

applying a causal mask for processing of the activity data embeddings.

11. The method of claim 2, wherein the structured data is first data and the respective timestamps are respective first timestamps, and wherein retrieving the structured data comprises:

retrieving, from the one or more data sources, the first data and second data representing an intent sequence associated with past user intents, wherein the intent sequence includes a plurality of intent entries associated with respective second timestamps.

12. The method of claim 11, further comprising:

generating intent embeddings based on the plurality of intent entries of the intent sequence;

generating, using a timestamp encoder model, timestamp embeddings based on the respective second timestamps; and constructing a time relativity matrix indicating temporal relationships between the respective second timestamps.

13. The method of claim 12, wherein executing the encoder-decoder transformer comprises:

generating the decoder output using the encoder output, the intent embeddings, the timestamp embeddings, and the time relativity matrix.

14. The method of claim 12, further comprising generating a combined time relativity matrix based on the respective first timestamps and the respective second timestamps, wherein executing the encoder-decoder transformer comprises:

generating a first stage decoder output based on the intent embeddings, the timestamp embeddings, and the time relativity matrix; and generating a second stage decoder output based on the first stage decoder output, the encoder output, and the combined time relativity matrix.

15. The method of claim 14, wherein generating the first stage decoder output comprises generating the first stage decoder output using a self-attention mechanism that uses the time relativity matrix, and wherein generating the second stage decoder output comprises generating the second stage decoder output, based on the first stage decoder output, using a cross-attention mechanism that uses the combined time relativity matrix.

16. A non-transitory, computer-readable medium, comprising instructions that, when executed by one or more processors, cause operations comprising:

retrieving structured data associated with a user and representing a plurality of activity sequences associated with a plurality of channels, wherein each activity sequence, of the plurality of activity sequences, includes a plurality of activity entries having data values for a plurality of fields;

flattening (i) the plurality of activity sequences into a single time-ordered activity sequence by reformatting tabular data representing data values for the plurality of activity sequences into sequential data ordered by timestamp across the plurality of channels, quantile discretizing continuous data values into discrete bins before flattening the data values into the single time-ordered activity sequence, and tokenizing the data values by converting the data values into tokens for processing by an encoder, thereby providing a simplified single encoder input that enables processing of heterogeneous data from multiple data sources and (ii) field name values corresponding to the plurality of fields into a single field name sequence having a corresponding order to the single time-ordered activity sequence;

generating (i) activity data embeddings using the single time-ordered activity sequence and (ii) field name embeddings using the single field name sequence;

executing an encoder-decoder transformer to generate, using the encoder of the encoder-decoder transformer, an encoder output based on a unified representation of the activity data embeddings and the field name embeddings, and to generate, using a decoder of the encoder-decoder transformer, a decoder output based on the encoder output;

determining, based on the decoder output, a prediction of an intent associated with the user; and transmitting information to cause presentation in a user interface of a selected content based on the prediction of the intent.

17. The non-transitory, computer-readable medium of claim 16, wherein the instructions further cause operations comprising:

generating, using a timestamp encoder model, timestamp embeddings based on respective timestamps associated with the plurality of activity entries of the plurality of activity sequences; and constructing a time relativity matrix indicating temporal relationships between the respective timestamps.

18. The non-transitory, computer-readable medium of claim 17, wherein executing the encoder-decoder transformer comprises:

executing the encoder-decoder transformer to generate, using the encoder, the encoder output based on the unified representation of the activity data embeddings, the field name embeddings, and the timestamp embeddings, and based on the time relativity matrix.

19. The non-transitory, computer-readable medium of claim 16, wherein the structured data is first data, and wherein retrieving the structured data comprises:

retrieving the first data and second data representing an intent sequence associated with past user intents, wherein the intent sequence includes a plurality of intent entries associated with respective timestamps.

20. The non-transitory, computer-readable medium of claim 19, wherein the instructions further cause operations comprising:

generating intent embeddings based on the plurality of intent entries of the intent sequence;

generating, using a timestamp encoder model, timestamp embeddings based on the respective timestamps; and constructing a time relativity matrix indicating temporal relationships between the respective timestamps.

* * * * *